US011943091B1

(12) United States Patent
Arunachalam et al.

(10) Patent No.: US 11,943,091 B1
(45) Date of Patent: Mar. 26, 2024

(54) DISTRIBUTED DIAGNOSTICS FOR NETWORK WIDE ROUTE POLICY ANALYZER AND OTHER USE CASES

(71) Applicant: Cisco Technology, Inc., San Jose, CA (US)

(72) Inventors: Chidambaram Arunachalam, Apex, NC (US); David C. White, Jr., St. Petersburg, FL (US); Magnus Mortensen, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/973,630

(22) Filed: Oct. 26, 2022

(51) Int. Cl.
*H04L 41/0631* (2022.01)
*H04L 65/1046* (2022.01)
*H04L 65/1104* (2022.01)

(52) U.S. Cl.
CPC ...... *H04L 41/0631* (2013.01); *H04L 65/1046* (2013.01); *H04L 65/1104* (2022.05)

(58) Field of Classification Search
CPC ............. H04L 41/0631; H04L 65/1104; H04L 65/1046
USPC ........................................................ 709/224
See application file for complete search history.

(56) References Cited

U.S. PATENT DOCUMENTS

| 8,306,513 | B2 * | 11/2012 | George | H04Q 3/62 455/414.1 |
| 8,625,409 | B2 * | 1/2014 | Kung | H04L 41/0604 370/221 |
| 9,137,369 | B1 * | 9/2015 | Mammem | H04L 65/1069 |
| 9,408,241 | B2 * | 8/2016 | Ku | H04W 36/0022 |
| 9,538,009 | B1 * | 1/2017 | Noble, Jr. | H04M 7/129 |
| 9,907,096 | B2 * | 2/2018 | Biage | H04W 76/50 |
| 10,715,391 | B2 * | 7/2020 | Rahman | H04L 41/0654 |
| 10,735,474 | B2 * | 8/2020 | Davis | H04L 65/403 |
| 10,944,622 | B2 * | 3/2021 | Al Ramady | H04L 41/0631 |
| 11,025,782 | B2 * | 6/2021 | Boussac | H04W 4/24 |
| 11,171,875 | B2 * | 11/2021 | Osterlund | H04L 41/5019 |
| 11,218,516 | B1 * | 1/2022 | Velusamy | H04L 65/80 |

(Continued)

FOREIGN PATENT DOCUMENTS

WO    2016196044 A1    12/2016

OTHER PUBLICATIONS

Cisco, "Troubleshooting Guide for Cisco Unified Communications Manager, Release 12.5(1)," https://www.cisco.com/c/en/us/td/docs/voice_ip_comm/cucm/trouble/12_5_1/cucm_b_troubleshooting-guide-1251.pdf, Dec. 2017, 204 pages.

*Primary Examiner* — Melvin H Pollack
(74) *Attorney, Agent, or Firm* — Edell, Shapiro & Finnan, LLC

(57) ABSTRACT

Presented herein are techniques to perform call failure diagnostics. A method includes receiving, at a network device, an indication of calls-of-interest, detecting, at the network device, a failure of one of the calls-of-interest, triggering, in response to the detecting, at the network device, diagnostics data analysis of data associated with the failure of one of the calls-of-interest, determining, based on the diagnostics data analysis, a cause of the failure of the one of the calls-of-interest, and notifying, by the network device, a management system of the cause of the failure of the one of the calls-of-interest and of recent configuration changes on the network device that are related to the cause of the failure of the one of the calls-of-interest.

20 Claims, 8 Drawing Sheets

(56) References Cited

U.S. PATENT DOCUMENTS

| | | | | |
|---|---|---|---|---|
| 11,483,684 | B1* | 10/2022 | Mirza | H04L 65/1045 |
| 11,546,243 | B1* | 1/2023 | Menon | H04W 24/06 |
| 11,632,320 | B2* | 4/2023 | Castle | H04L 43/0817 |
| | | | | 709/224 |
| 2014/0229614 | A1* | 8/2014 | Aggarwal | H04L 65/1063 |
| | | | | 709/224 |
| 2016/0056994 | A1 | 2/2016 | Cales et al. | |
| 2018/0048548 | A1 | 2/2018 | Hui et al. | |
| 2018/0367370 | A1 | 12/2018 | Tapia et al. | |
| 2020/0067794 | A1* | 2/2020 | Calo | G06F 9/45558 |
| 2021/0234795 | A1* | 7/2021 | Wu | H04L 69/323 |
| 2022/0036302 | A1* | 2/2022 | Cella | G06Q 10/0834 |
| 2022/0058072 | A1* | 2/2022 | Poghosyan | G06F 18/24317 |
| 2022/0058073 | A1* | 2/2022 | Poghosyan | G06F 11/079 |
| 2022/0116265 | A1* | 4/2022 | Boyle, III | H04L 41/064 |
| 2022/0182278 | A1* | 6/2022 | Vangapalli | H04L 67/30 |
| 2023/0033680 | A1* | 2/2023 | Whatley | G06N 5/022 |
| 2023/0086473 | A1* | 3/2023 | Deliwala | H04L 47/762 |
| | | | | 709/226 |

* cited by examiner

… (1)

DISTRIBUTED DIAGNOSTICS FOR NETWORK WIDE ROUTE POLICY ANALYZER AND OTHER USE CASES

TECHNICAL FIELD

The present disclosure relates to analyzing call or, more generally, network routing failures, in a distributed fashion.

BACKGROUND

The ability to successfully receive and make voice calls is a critical function for many businesses. Call routing-related configuration changes are often made in a unified communications (UC) network to address business changes such as mergers, acquisitions, opening of new branches, as well as move, add, change, and delete (MACD) services. Unintentional misconfiguration by an administrator of a call controller, session border controller, and/or gateways can lead to inbound and outbound call routing failures. If these calls are related to business-critical functions such as toll-free numbers, then the business impact may be severe. To minimize such impact, it is important to proactively detect call routing failures, determine their root cause(s), and resolve issues quickly.

Currently, root cause analysis is performed by collecting diagnostic logs from multiple on-premise network devices in a customer enterprise. The collection of such logs and the transfer of associated large log files to a cloud-based analysis system is time consuming, inefficient, and is not conducted in real-time.

DETAILED DESCRIPTION

Overview

Figure 1:
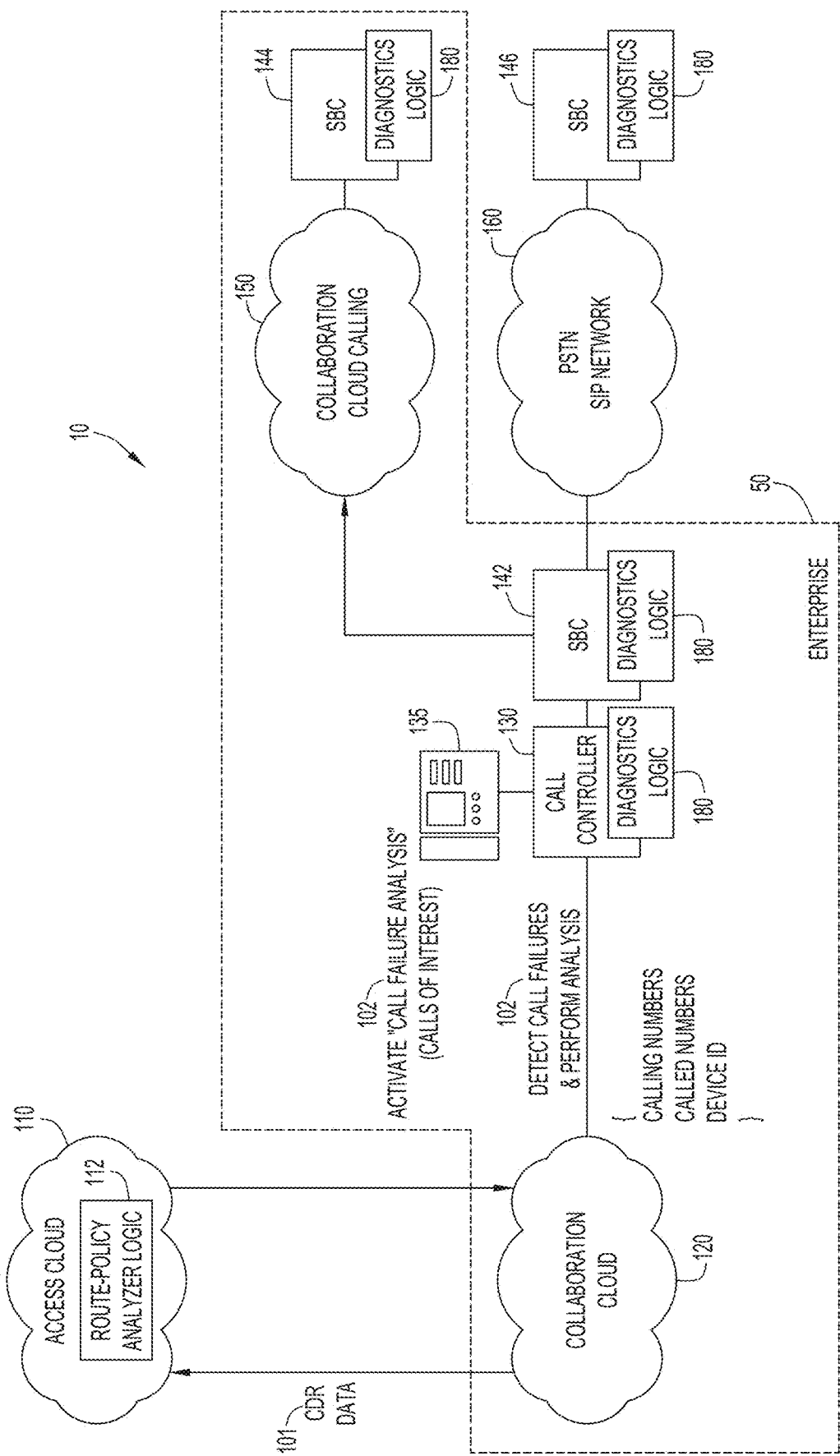
FIG. 1 shows several components of a calling system network topology, including route policy analyzer logic hosted by an access cloud, and diagnostics logic hosted on at least one of a call controller and a session border controller, according to an example embodiment.

Presented herein are techniques to perform call failure diagnostics in a more efficient and timely manner. A method includes receiving, at a network device, an indication of calls-of-interest, detecting, at the network device, a failure, including a total failure or, e.g., poor quality audio, of one of the calls-of-interest, triggering, in response to the detecting, at the network device, diagnostics data analysis of data associated with the failure of one of the calls-of-interest, determining, based on the diagnostics data analysis, a cause of the failure of the one of the calls-of-interest, and notifying, by the network device, a management system of the cause of the failure of the one of the calls-of-interest and of recent configuration changes on the network device that are related to the cause of the failure of the one of the calls-of-interest.

In another embodiment, a device is provided. The device includes an interface configured to enable network communications, a memory, and one or more processors coupled to the interface and the memory, and configured to: receive an indication of calls-of-interest, detect a failure, including a total failure or, e.g., poor quality audio, of one of the calls-of-interest, trigger, in response to detecting the failure of one of the calls-of-interest, diagnostics data analysis of data associated with the failure of one of the calls-of-interest, determine, based on the diagnostics data analysis, a cause of the failure of the one of the calls-of-interest, and notify a management system of the cause of the failure of the one of the calls-of-interest and of recent configuration changes that are related to the cause of the failure of the one of the calls-of-interest.

Example Embodiments

The embodiments described herein provide a method to distribute the execution of diagnostics (sometimes referred to in the field as "Intellectual Capital") that detect a call routing failure, including a total failure or, e.g., poor quality audio, etc. The diagnostics analyze the root cause(s) of the failure and are performed in real-time at collaboration network devices in order to minimize the need to send diagnostics and operational data to a centralized cloud function for analysis. In one possible implementation, peer network devices may exchange their diagnostics execution capabilities, and respective peer network devices may trigger the diagnostics execution on a peer network device, on-demand. The described methodology also includes approaches to keep the diagnostics (or diagnostics logic) up-to-date on respective network devices. The diagnostics, though described herein in the context of call failures, may also be leveraged to run diagnostics related, more generally to, e.g., routing, security problems in the network, etc. While the description below focuses on "calls-of-interest," those skilled in the art will appreciate that "calls" may be considered more broadly to include more general "connections" including, e.g., call control, an audio stream, a video stream, a TCP/UDP connection, etc.

FIG. 1 shows several components of a calling system network topology 10, including route policy analyzer logic 112 hosted by an access cloud 110, and diagnostics logic 180 hosted on at least one of a call controller 130 and at least one session border controller 142, 144, 146, according to an example embodiment. More specifically, access cloud 110 may include one more computing devices, servers, etc. configured to enable a network administrator to sign-up for cloud calling services, and perform other administrative tasks. Access cloud 110 may more generally provide asset inventory, adoption insights, proactive insights such as list of security advisories, field notices, bugs impacting the assets, best practices, software recommendation insights, and perform solution level troubleshooting, etc. Access cloud 110 is in communication with collaboration management cloud 120 (i.e., a management system), which may also include one more computing devices, servers, etc. Collaboration management cloud 120 is configured to include, e.g., a user interface (not shown) that enables a customer, e.g., an enterprise or network administrator, to control telephone/calling functionality within a given enterprise 50. In some possible implementations access cloud 110 and collaboration management cloud 120 may be hosted in a single cloud environment.

Collaboration management cloud 120 is in communication with a call controller 130, which is configured to physically connect a hardwired telephone set 135, or perhaps to wirelessly connect with one or more wireless handsets (e.g., a mobile or smart phone, not shown), and to, e.g., switch incoming and outgoing calls to/from such a telephone set 135 or wireless handset, and to provide calling functions such as hold, forward, conferencing, etc. Call controller 130 may be in communication with a session border controller (SBC) 142, which may operate as, e.g., a gateway of sorts to other networks or cloud infrastructure such as collaboration cloud calling 150, which may be part of collaboration management cloud 120, a public switched telephone network (PSTN)/session initial protocol (SIP) network (PSTN/SIP network 160), etc. Each of collaboration cloud calling 150 and PSTN/SIP network 160 are in communication with its own session border controller, namely SBC 144 and SBC 146 to provide connectivity to other networks, and ultimately to a distal endpoint. As shown in the figure, each of call controller 130, SBC 142, SBC 144, and SBC 146 may host diagnostics logic 180.

In the topology shown in FIG. 1, call controller 130, SBC 142, SBC 144, and SBC 146 have bidirectional connectivity to collaboration management cloud 120 and/or access cloud 110. This network connectivity is used to provision features and send telemetry data to collaboration management cloud 120. The telemetry data includes information such as call detail records (CRDs) (details of calls placed in the network), feature usage, critical events, etc. The embodiments described herein leverage this bi-directional connectivity to distribute updates for diagnostics logic 180, activate execution of diagnostics logic 180, and receive execution or diagnostics results from diagnostics logic 180.

With continued reference to FIG. 1, and more specifically, access cloud 110 is in communication with collaboration management cloud 120 and receives, at 101 call detail records (CDRs) periodically (e.g., every few minutes or hours). This information is used, by route policy analyzer logic 112, to identify a list of "calls of interest" for selected users (e.g., enterprise customers). Such a list could be determined based on business needs such as top-ten frequently called numbers, Toll-Free numbers, calls placed by executives, calls to support teams, etc., and may be configurable by the enterprise administrator.

As noted, network devices both in the on-premise and in the cloud, namely call controller 130, SBC 142, SBC 144, and SBC 146, are configured to run diagnostics logic 180 natively. In an embodiment, each such device comes with "pre-packaged" diagnostics logic 180 that is part of the device's underlying software or hardware. As the device is upgraded to, e.g., a new software version or components are upgraded, the device also receives a new version of diagnostics logic 180 that is updated to take into consideration any new features introduced in the device software version or hardware upgrade. This avoids a situation in which an older version of diagnostics logic 180 is run on the device but is unaware of relevant features recently-introduced in the device. A good example is call routing failure analysis which takes into consideration the call routing features available within the device in which diagnostics logic 180 is run. If the call routing failure analysis operating as part of diagnostics logic 180 is unaware of a new routing feature and that feature has been enabled, and configured, then the diagnostics analysis result may be inaccurate.

In an embodiment, diagnostics logic 180 on each device is either automatically enabled or manually activated by an enterprise administrator via, e.g., route policy analyzer logic 112.

To initiate execution of diagnostics logic 180, at 102, an activation request (Activate Call Failure Analysis {Calls of Interest}) is sent from access cloud 110 to collaboration management cloud 120 along with input parameters. In this example, the list of {Calls of Interest}, namely Calling numbers, Called numbers, and Device ID) are sent as input parameters. The "Device ID" may, in one implementation, represent a collaboration endpoint (not shown) such that the system will, for example, monitor all calls from the collaboration endpoint used by an executive. Also, calls of interest could include one or more of these three parameters, but it is not required to always specify all the three parameters.

Based on the Device ID parameter, collaboration management cloud 120 identifies the set of network devices (e.g., call controller 130, SBC 142, SBC 144, and/or SBC 146) in which execution of diagnostics logic 180 is to occur, and may check whether the identified devices in the network have appropriate diagnostics execution capabilities and, then at 103, activates diagnostics logic 180 in those devices so that they thereafter detect call failures and perform failure analysis.

The activated diagnostics logic 180 in, e.g., call controller 130 starts to monitor calls and detects call failures specifically for the calls of interest provided as input. Diagnostics logic 180 may use several sources to perform its analysis including system logs and CDR data to detect call failures, and analyze call signaling in the local logs to determine the root cause of the failure.

To enable end-to-end call failure detection and analysis, diagnostics logic 180, as shown in FIG. 1, may also be deployed and enabled in edge devices (e.g., SBCs 144, 146) that are in communication with collaboration cloud calling 150 and PSTN/SIP network 160.

Diagnostics logic 180 takes different actions depending on call disconnect reason or location as described in the following scenarios, beginning first with the scenario illustrated by FIG. 2.

Figure 2:
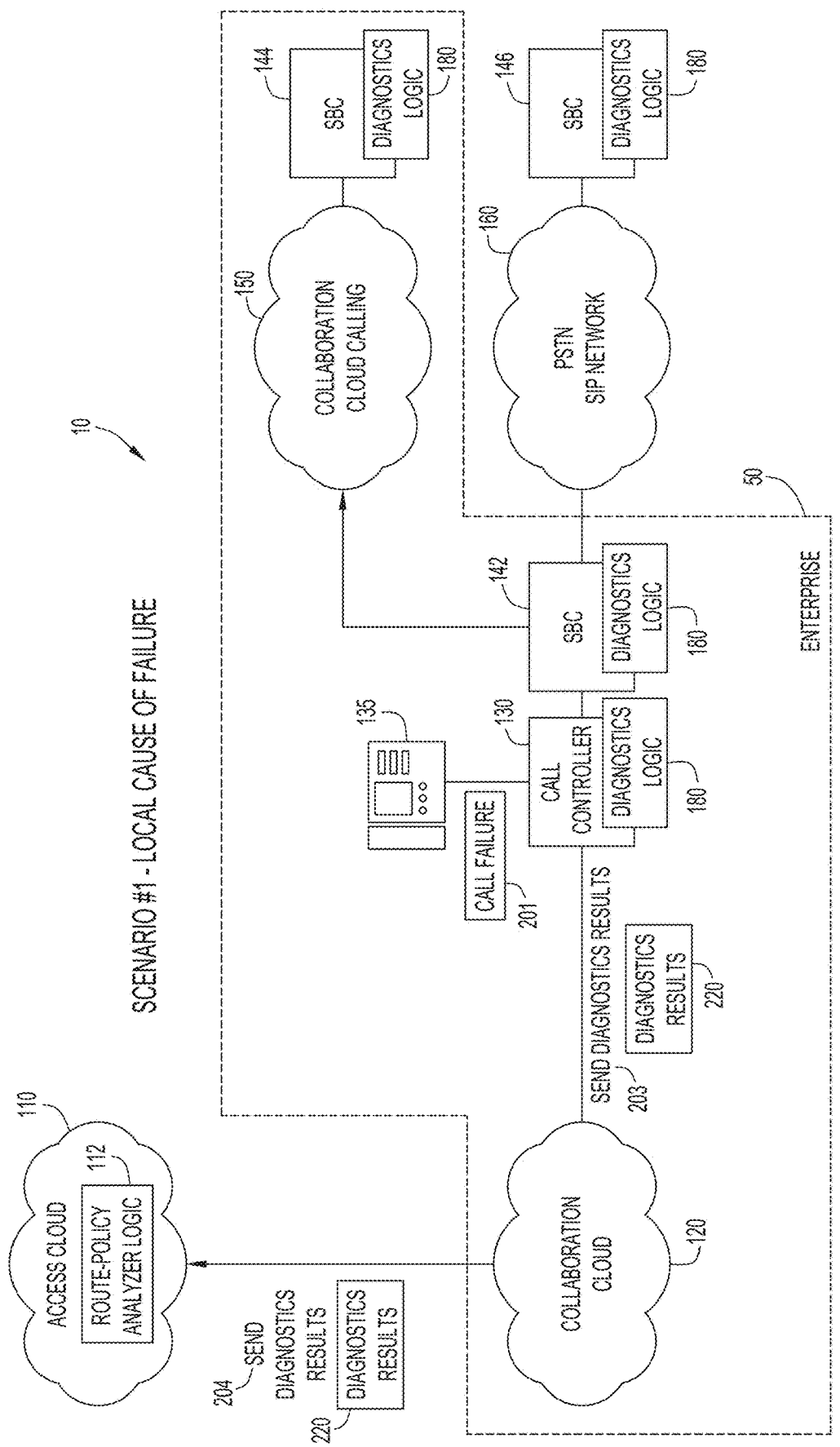
FIG. 2 illustrates a first scenario in which a call fails as a result of a local failure and how a call controller provides diagnostics results to a collaboration management cloud, according to an example embodiment.

FIG. 2 illustrates a first scenario in which a call fails as a result of a local failure and how call controller 130 provides diagnostics results to collaboration management cloud 120, according to an example embodiment. More specifically, at 201 a call that is within the calls of interest fails. Diagnostics logic 180 executing on call controller 130 detects the failure. As a result, at 202, diagnostics logic 180 triggers diagnostics data analysis, and identifies that the source of the call disconnect is local and determines, e.g., that a "lack of route" is the root cause. Diagnostics logic 180 also analyzes recent and relevant configuration changes (e.g., deletion of a route pattern in call controller 130. At 203, diagnostics logic 180 sends diagnostics results 220 to the collaboration management cloud 120. Diagnostics results 220 may include call details such as calling, called number, device, user that experienced the problem, etc., along with the recent configuration changes that contributed to the failure. In an embodiment, collaboration management cloud 120, at 204, passes diagnostics results 220 to access cloud 110, which can take further actions such as informing an administrator through a visual display, suggesting remediation actions, or even triggering a configuration rollback after obtaining administrator approval.

As an example, diagnostics results 220 may include the following information:

{
Issue ID
Issue type: Call failure
Issue details
 calling number: 5001
 called number xxx193926009
 device ID: SEP1234abcd
 User ID: user1
}
Reason: No route
Source: 10.1.1.21 (i.e., call controller 130)
Recent changes:
 Config changes:
  Route pattern 91.X
  Action: Deleted
  Timestamp <data, time>
  UserID: <UserID>
 }
}

Figure 3:
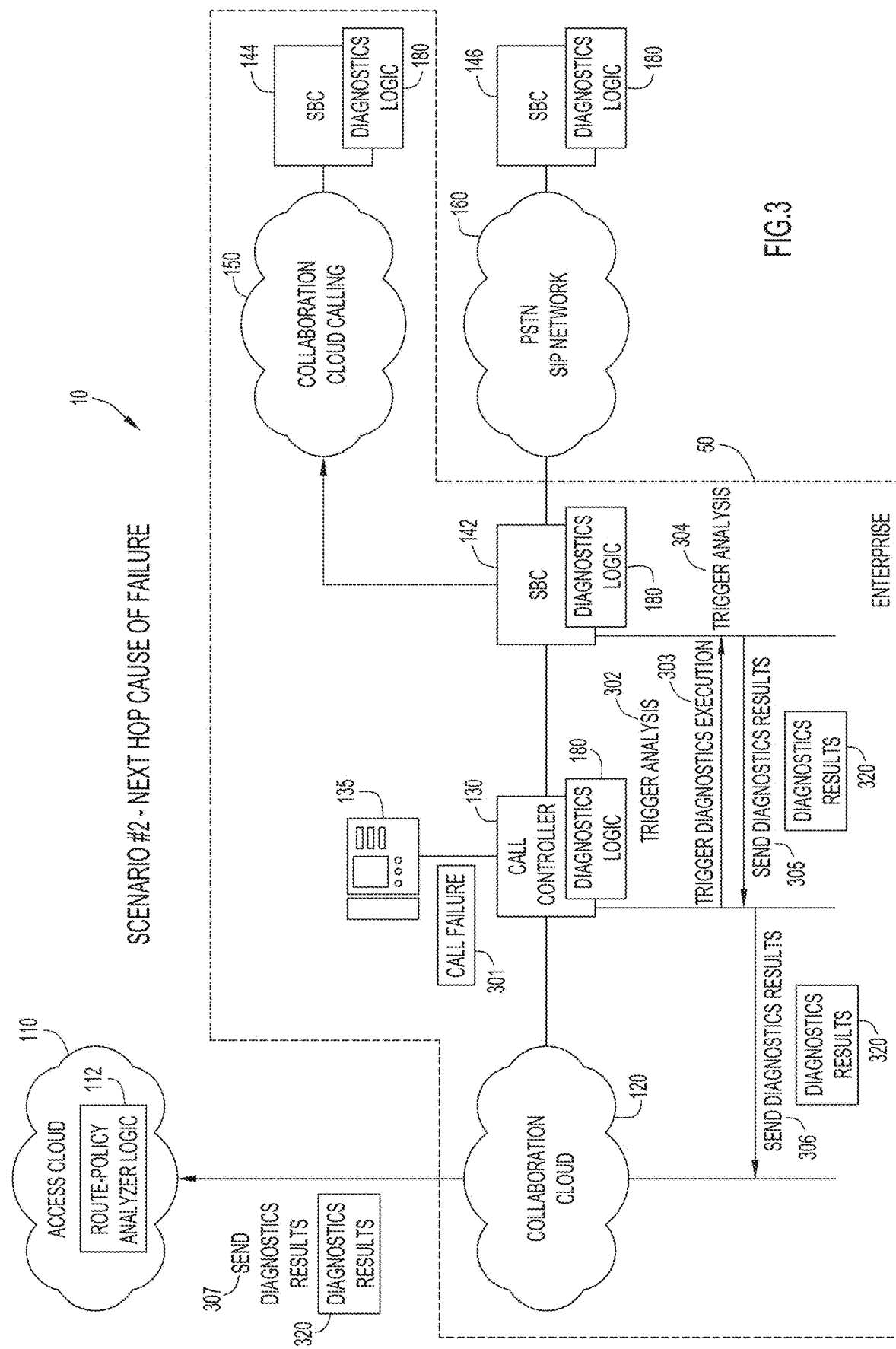
FIG. 3 illustrates a second scenario in which a call fails as a result of a next hop failure and how a session border controller provides diagnostics results to a call controller, which then passes the diagnostics results to the collaboration management cloud, according to an example embodiment.

FIG. 3 illustrates a second scenario in which a call fails as a result of a next hop failure and how session border controller 142 provides diagnostics results 220 to call controller 130, which then passes the diagnostics results 220 to collaboration management cloud 120, according to an example embodiment. More specifically, at 301 a call that is within the calls of interest fails. Diagnostics logic 180 executing on call controller 130 detects the failure. As a result, at 302, diagnostics logic 180 triggers diagnostics data analysis, and identifies that the source of the call disconnect is a next hop device. Thus, at 303, diagnostics logic 180 in call controller 130 triggers diagnostics execution at the next hop by requesting the peer device (SBC 142) to run diagnostics of a specific type (e.g., call failure analysis), specifying a minimum version of diagnostics, and passing the input parameters such as call specific details (calling, called number, session-ID, time of occurrence etc.).

SBC 142 receives and verifies the diagnostics task execution request. As appropriate, diagnostics logic 180 executing on SBC 142 downloads a newer version of the diagnostics if the current version on SBC 142 is lesser than the minimum version specified in the request. Once verified, diagnostics logic 180 on SBC 142, at 304, executes the diagnostics task which analyzes the local diagnostics data, determines that the failure is due to "No route" and identifies relevant configuration changes (Route policy 919 deleted).

At 305, SBC 142 sends diagnostics results 320 to the requesting device, namely, in this case, call controller 130. It is noted that the diagnostics task execution request, at 303, and response, at 305, can be exchanged across an existing secure call signaling connection between the network peers.

Diagnostics logic 180 in call controller 130 then formats the diagnostics results 320 as appropriate. At 306, call controller 130 sends diagnostics results 320 to collaboration management cloud 120. Diagnostics results 320 may include call details such as calling, called number, device, user that experienced the problem, etc., along with the recent configuration changes that contributed to the failure. In an embodiment, collaboration management cloud 120, at 307, passes diagnostics results 320 to access cloud 110, which can take further actions such as informing an administrator through a visual display, suggesting remediation actions, or even triggering a configuration rollback after obtaining administrator approval.

As an example, diagnostics results 320 may include the following information:

{ . . .
Reason: No route
Source: 10.1.3.21 (SBC 142)
Recent changes:
Config changes: {
Route policy 919
Action: Deleted
Timestamp: <date, time>
UserID: <UserID>
}

Figure 4:
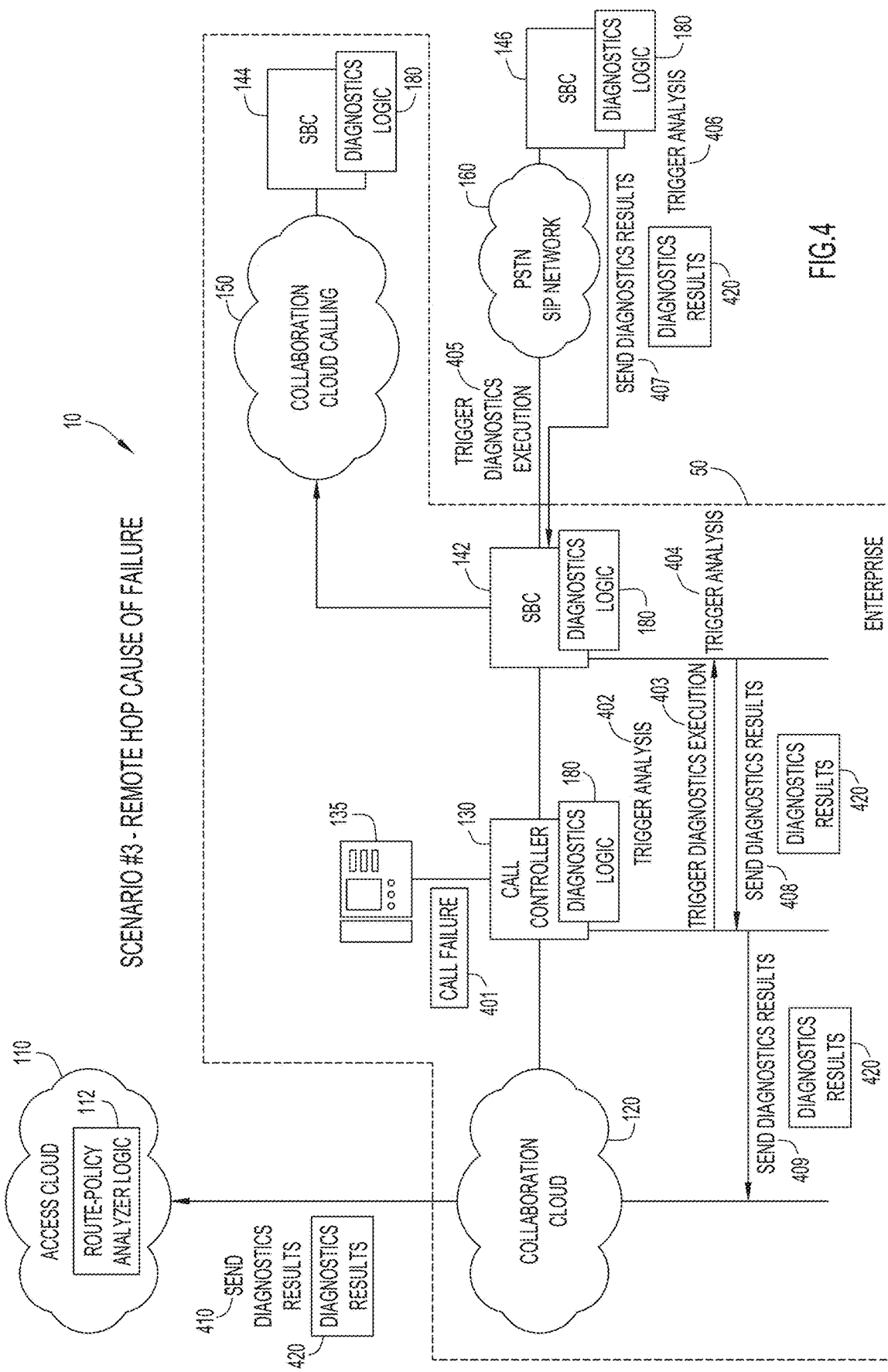
FIG. 4 illustrates a third scenario in which a call fails as a result of a remote hop failure and how a distal session border controller provides diagnostics results to a proximal session border controller, which passes the diagnostics results to a call controller, which then passes the diagnostics results to the collaboration management cloud, according to an example embodiment.

FIG. 4 illustrates a third scenario in which a call fails as a result of a remote hop failure and how session border controller 146 provides diagnostics results to a session border controller 142, which passes the diagnostics results to call controller 130, which then passes diagnostics results 420 to collaboration management cloud 120, according to an example embodiment. More specifically, at 401 a call that is within the calls of interest fails. Diagnostics logic 180 executing on call controller 130 detects the failure. As a result, at 402, diagnostics logic 180 triggers diagnostics data analysis, and identifies that the source of the call disconnect is a next hop device. Thus, at 403, diagnostics logic 180 in call controller 130 triggers diagnostics execution at the next hop by requesting the peer device (SBC 142) to run diagnostics of a specific type (e.g., call failure analysis), specifying a minimum version of diagnostics, and passing the input parameters such as call specific details (calling, called number, session-ID, time of occurrence etc.).

SBC 142 receives and verifies the diagnostics task execution request. As appropriate, diagnostics logic 180 executing on SBC 142 downloads a newer version of the diagnostics if the current version on SBC 142 is lesser than the minimum version specified in the request. Once verified, diagnostics logic 180 on SBC 142, at 404, executes the diagnostics task which analyzes the local diagnostics data, determines that the failure is at its own next hop.

Accordingly, at 405, diagnostics logic 180 on SBC 142 triggers diagnostics execution at SBC 146 by sending a diagnostics trigger message and passing the input parameters. Diagnostics logic 180 at SBC 146 receives and verifies the diagnostics task execution request. As appropriate, diagnostics logic 180 executing on SBC 146 downloads a newer version of the diagnostics if the current version on SBC 146 is lesser than the minimum version specified in the request. Once verified, diagnostics logic 180 on SBC 146, at 406, executes the diagnostics task which analyzes the local diagnostics data, and determines that the failure is due to "No route" and identifies relevant configuration changes (Route policy 919 deleted).

At 407, SBC 146 sends diagnostics results 420 to the requesting device, namely, in this case, SBC 142, which then, at 408, sends diagnostics results 420 to call controller 130. It is noted that the diagnostics task execution requests at 403, 405, and response at 407, 408 can be exchanged across an existing secure call signaling connection between the network peers.

Diagnostics logic 180 in call controller 130 then formats the diagnostics results 420 as appropriate. At 409, call controller 130 sends diagnostics results 420 to collaboration management cloud 120. Diagnostics results 420 may include call details such as calling, called number, device, user that experienced the problem, etc., along with the recent configuration changes that contributed to the failure. In an embodiment, collaboration management cloud 120, at 410, passes diagnostics results 420 to access cloud 110, which can take further actions such as informing an administrator through a visual display, suggesting remediation actions, or even triggering a configuration rollback with optional administrator approval.

Diagnostics results 420 may be similar to diagnostics results 320.

It is noted that a similar distributed diagnostics execution flow can occur if the source of the call disconnect is present within collaboration cloud calling 150. In such a case, SBC 142 would trigger diagnostics execution at SBC 144.

Figure 5:
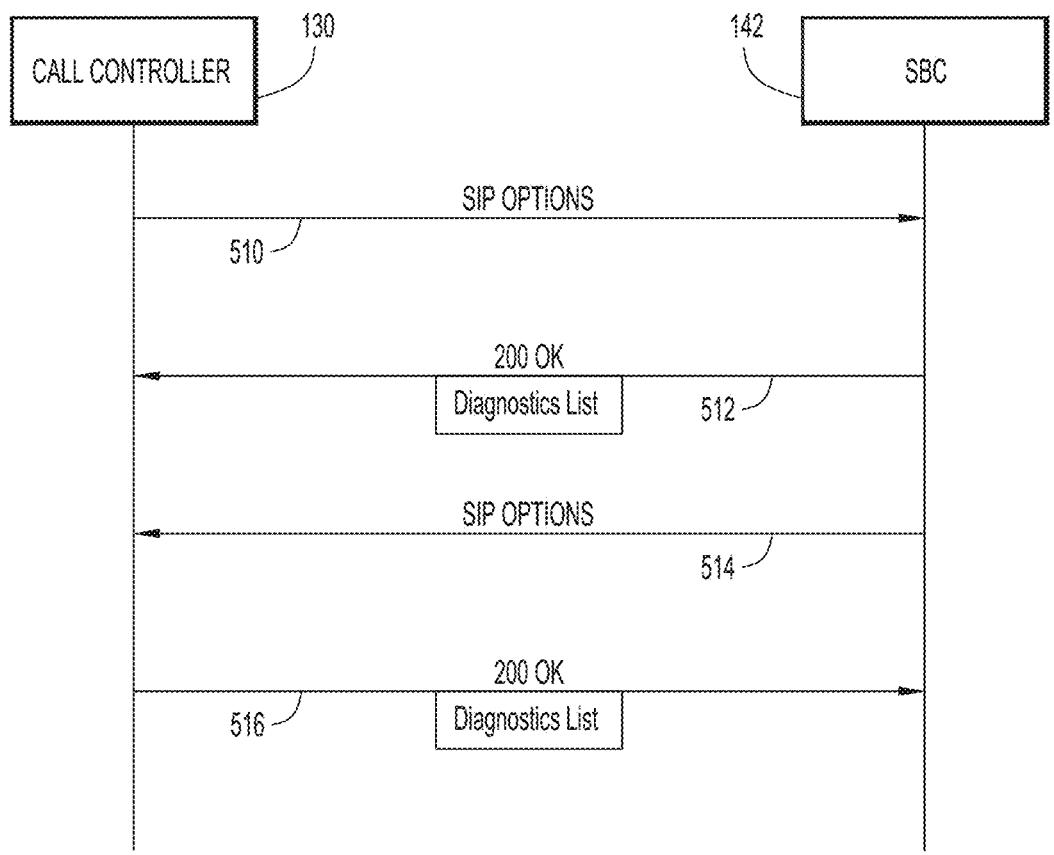
FIG. 5 illustrates a diagnostics capabilities exchange between a call controller and a session border controller, according to an example embodiment.

FIG. 5 illustrates a diagnostics capabilities exchange between call controller 130 and SBC 142, according to an example embodiment. In one possible implementation, call controller 130, at 510, may sends a SIP OPTIONS request to SBC 142 to discover the media and diagnostics capabilities of that peer device. SBC 142, in response at 512, sends its diagnostics capabilities details (such as names and version) in the form of a diagnostics list. SBC 142 at 514 may likewise send at SIP OPTIONS request to call controller 130, and receive, at 516, a similar diagnostics list.

An example of such an exchange is set forth below:
Received:
OPTIONS sip:cube1.example.com:5060 SIP/2.0
Via: SIP/2.0/TCP 172.18.110.205:5060;
  branch=z9hG4bK7f3602e9b1
From: <sip:172.18.110.205>;tag=791723988
To: <sip:cube1.example.com>
Date: Sun, 24 Jun. 2022 16:02:34 GMT
Call-ID: 73ce80-b2f1cO9a-39-cd6e12ac@172.18.110.205
User-Agent: CallController11.5
CSeq: 101 OPTIONS
Contact: <sip:172.1.1100.205:5060;transport=tcp>
Accept: application/sdp, application/json
Max-Forwards: 0
Content-Length: 0
39396538: Jun 24 16:02:34.087 UTC: //-1/xxxxxxxxxxxx/SIP/Msg/ccsipDisplayMsg:
Sent:
SIP/2.0 200 OK
Via: SIP/2.0/TCP 172.18.110.205:5060;
  branch=z9hG4bK7f3602e9b1
From: <sip:172.18.110.205>;tag=791723988
To: <sip:cube1.example.com>;tag=A7928DE5-25A5
Date: Sun, 24 Jun. 2022 16:02:34 GMT
Call-ID: 73ce30-b2f1cO9a-39-cd6e12ac@172.18.110.205
Server: SIPGateway/IOS-16.6.1
CSeq: 101 OPTIONS
Allow: INVITE, OPTIONS, BYE, CANCEL, ACK, PRACK, UPDATE, REFER, SUBSCRIBE, NOTIFY, INFO, REGISTER
Allow-Events: telephone-event
Accept: application/sdp, application/json
Supported: timer, resource-priority, replaces, sdp-anat
Content-Type: multipart/mixed;boundary="boundary1"
Content-Length: 720
--boundary1
Content-type: application/sdp
v=0
o=SystemsSIP-GW-UserAgent 3801 2582 IN IP4 172.18.110.203
s=SIP Call
c=IN IP4 172.18.110.203
t=0 0
m=audio 0 RTP/AVP 18 0 8 9 4 2 15 3
c=IN IP4 172.18.110.203
m=image 0 udptl t38
c=IN IP4 172.18.110.203
a=T38FaxVersion:0
a=T38MaxBitRate:9600
a=T38FaxRateManagement:transferredTCF
a=T38FaxMaxBuffer:200
a=T38FaxMaxDatagram:320
a=T38FaxUdpEC:t38UDPRedundancy
--boundary1
Content-type: application/json
{
  "device": {
    "model": "ISR4451",
    "version": "IOSXE-16.6.1",
    "vendor": "Cisco"
  },
  "diagnosticsList": [
    {
      "name": "call-failure-analysis",
      "version": "1.0"
    },
    {
      "name": "routing-failure-analysis",
      "version": "1.0"
    }
  ]
}

Figure 6:
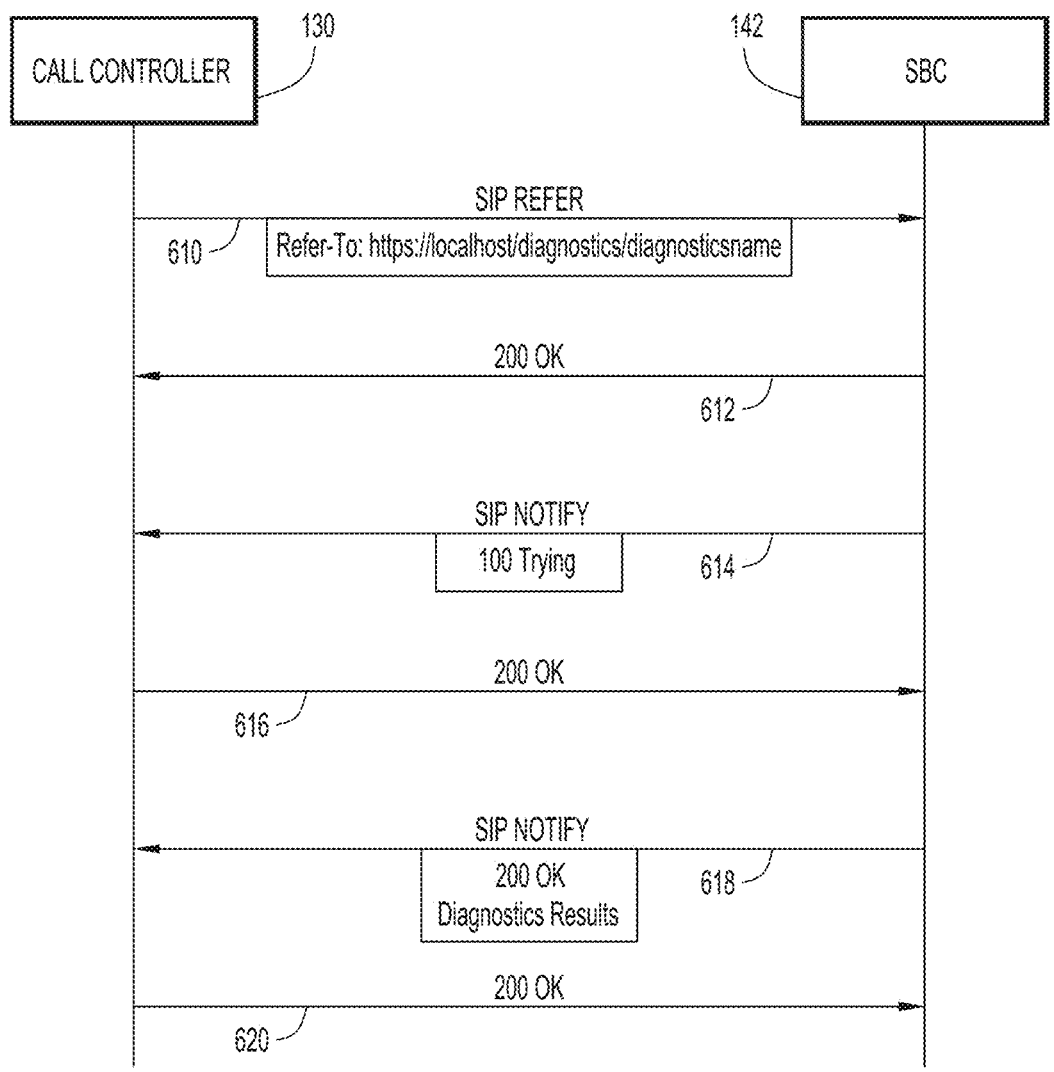
FIG. 6 illustrates an exchange between a call controller and a session border controller to trigger execution of diagnostics logic on the session border controller, according to an example embodiment.

FIG. 6 illustrates an exchange between call controller 130 and SBC 142 to trigger diagnostics on SBC 142, according to an example embodiment. At 610, call controller 130 sends an out-of-dialog SIP REFER request with the Refer-To header set to https://localhost/diagnsotics/{diagnosticsTaskName}. The message body of the SIP REFER includes the diagnostics task input parameters and minimum version of diagnostics logic 180. SBC 142 verifies and validates the SIP REFER request and, at 612, sends 200 OK if it is valid and from a trusted next hop peer. At 614, SBC 142 sends a SIP NOTIFY message with "100 Trying" in the message body to indicate that it is working on processing the request, to which, at 616, call controller 130 responds with a 200 OK. After the diagnostics execution is complete, SBC 142, at 618, sends another SIP NOTIFY request with message body containing "200 OK" indicating that the request processing is complete along with the diagnostics results in, e.g., JSON format. Call controller 130 may respond, at 620, with a corresponding 200 OK.

If there were any errors while issuing the diagnostics results, relevant response codes would be returned. For example, if the diagnostics results were not present or unavailable on the device a SIP 404 message may be returned. If the diagnostics execution engine of SBC 142 fails or encounters a fault in the diagnostics a SIP "500 Internal Server Error could indicate the failure. Should the IC execution system be offline or completely faulted, a SIP 503 "Service Unavailable" message would be logically returned to the IC request.

Figure 7:
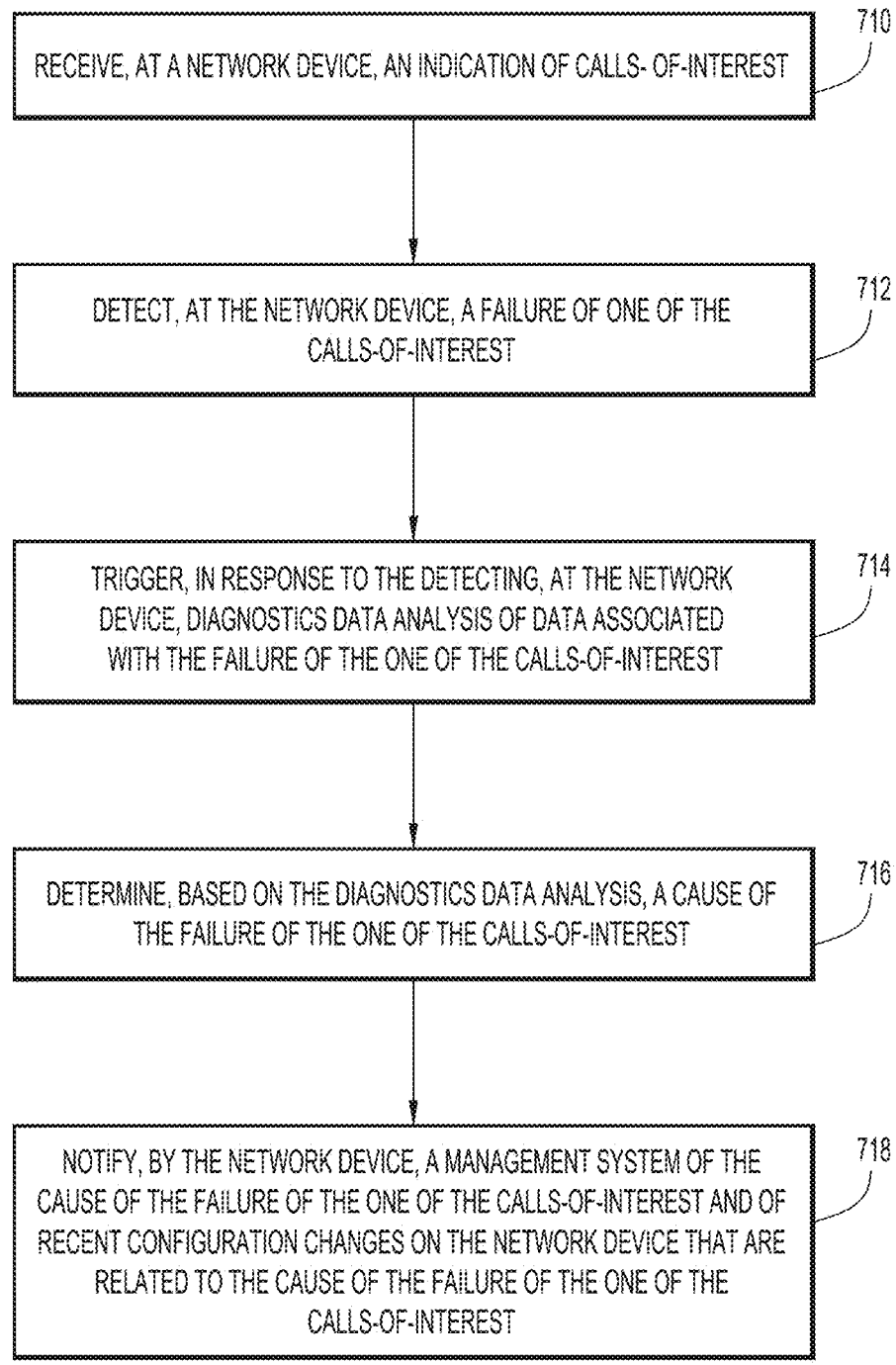
FIG. 7 shows a series of operations that may be executed by diagnostics logic, according to an example embodiment.

FIG. 7 shows a series of operations that may be executed by diagnostics logic 180, according to an example embodiment. At 710, an operation includes receiving, at a network device, an indication of calls-of-interest. At 712, an operation includes detecting, at the network device, a failure of one of the calls-of-interest. At 714, an operation includes triggering, in response to the detecting, at the network device, diagnostics data analysis of data associated with the failure of one of the calls-of-interest. At 716, an operation includes determining, based on the diagnostics data analysis, a cause of the failure of the one of the calls-of-interest. And, at 718, an operation includes notifying, by the network device, a management system of the cause of the failure of the one of the calls-of-interest and of recent configuration changes on the network device that are related to the cause of the failure of the one of the calls-of-interest.

Figure 8:
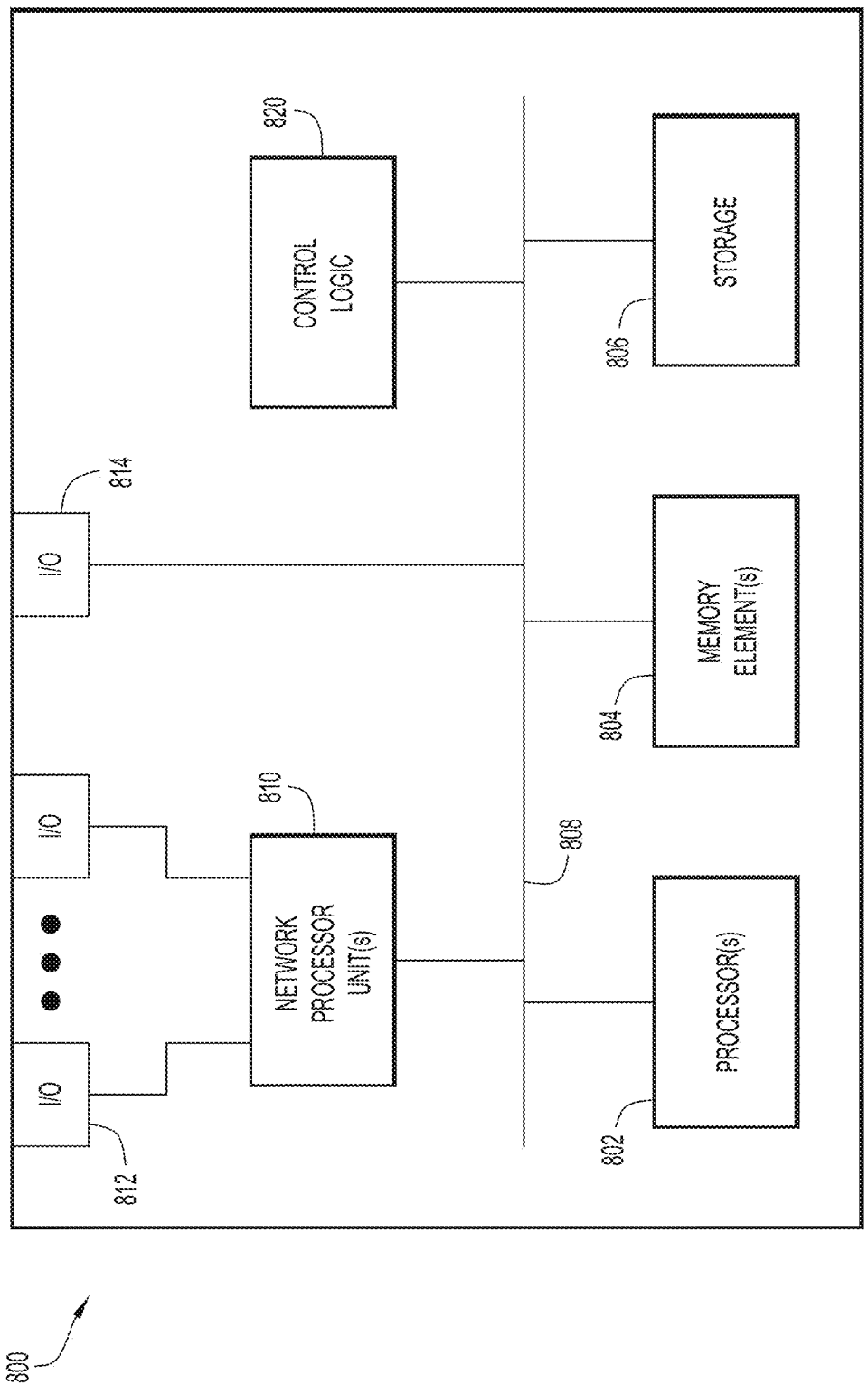
FIG. 8 is a block diagram of a computing device, server, etc., that may be configured to host route policy analyzer logic or diagnostics logic and perform the techniques described herein, according to an example embodiment.

FIG. 8 is a block diagram of a computing device, server, etc., that may be configured to host route policy analyzer logic or diagnostics logic and perform the techniques described herein, according to an example embodiment.

In various embodiments, a computing device, such as computing device 800 or any combination of computing devices 800, may be configured as any entity/entities as discussed for the techniques depicted in connection with FIGS. 1-7 in order to perform operations of the various techniques discussed herein.

In at least one embodiment, the computing device 800 may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820 (which could include, for example, route policy analyzer logic 112 or diagnostics logic 180). In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with memory element(s) 804 (or vice versa) or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 (wired and/or wireless) to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, any other I/O port(s), and/or antenna(s)/antenna array(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to computing device 800. For example, I/O interface(s) 814 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 804 and/or storage 806 can store data, software, code, instructions (e.g., processor instructions), logic, parameters, combinations thereof, and/or the like used for operations described herein. This includes memory element(s) 804 and/or storage 806 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

In sum, in one embodiment a method is provided. The method may include receiving, at a network device, an indication of calls-of-interest, detecting, at the network device, a failure of one of the calls-of-interest, triggering, in response to the detecting, at the network device, diagnostics data analysis of data associated with the failure of one of the calls-of-interest, determining, based on the diagnostics data analysis, a cause of the failure of the one of the calls-of-interest, and notifying, by the network device, a management system of the cause of the failure of the one of the calls-of-interest and of recent configuration changes on the network device that are related to the cause of the failure of the one of the calls-of-interest.

In the method, the indication of the calls-of-interest may include at least one of a calling number and a called number.

In the method, the network device may be a call controller.

In the method, the network device may be a session border controller.

In the method, the network device may be deployed within an enterprise network.

In the method, the notifying may include sending at least one of a calling number, a called number, a device ID to the management system.

The method may further include determining, at the network device, that the failure of the one of calls-of-interest occurred at another network device along a network path, and sending, from the network device to the another network device along the network path, a trigger command that is configured to cause the another network device to determine a cause of the failure of the one of the call-of-interest.

In the method, the network device may be a call controller and the another network device may be a session border controller.

The method may further include the network device exchanging diagnostics data analysis capabilities with the another network device.

The method may further include exchanging the diagnostics data analysis via session initiation protocol (SIP).

A device may also be provided. The device may include an interface configured to enable network communications, a memory, and one or more processors coupled to the interface and the memory, and configured to: receive an indication of calls-of-interest, detect a failure of one of the calls-of-interest, trigger, in response to detecting the failure of one of the calls-of-interest, diagnostics data analysis of data associated with the failure of one of the calls-of-interest, determine, based on the diagnostics data analysis, a cause of the failure of the one of the calls-of-interest, and notify a management system of the cause of the failure of the one of the calls-of-interest and of recent configuration changes that are related to the cause of the failure of the one of the calls-of-interest.

In an embodiment the indication of the calls-of-interest may include at least one of a calling number and a called number.

The device may be implemented as a call controller.

The device may be implemented as a session border controller.

The one or more processors may be further configured to notify by sending at least one of a calling number, a called number, a device ID to the management system.

The one or more processors may be further configured to determine that the failure of the one of calls-of-interest occurred at network device along a network path and to send, to the network device along the network path, a trigger command that is configured to cause the network device along the network path to determine a cause of the failure of the one of the call-of-interest.

In still another embodiment, there is provided one or more non-transitory computer readable storage media encoded with instructions that, when executed by a processor, cause the processor to: receive an indication of calls-of-interest, detect a failure of one of the calls-of-interest, trigger, in response to detecting the failure of one of the calls-of-interest, diagnostics data analysis of data associated with the failure of one of the calls-of-interest, determine, based on the diagnostics data analysis, a cause of the failure of the one of the calls-of-interest, and notify a management system of the cause of the failure of the one of the calls-of-interest and of recent configuration changes that are related to the cause of the failure of the one of the calls-of-interest.

The indication of the calls-of-interest may include at least one of a calling number and a called number.

The processor may be configured to operate as a call controller.

The processor may be configured to operate as a session border controller.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   receiving, at a network device that is configured to switch incoming and outgoing calls, a list of multiple calls-of-interest to monitor;
   detecting, at the network device, a failure of one of the calls-of-interest;
   triggering, in response to the detecting, at the network device, diagnostics data analysis of data associated with the failure of the one of the calls-of-interest;
   determining, at the network device, based on the diagnostics data analysis, a cause of the failure of the one of the calls-of-interest; and
   notifying, by the network device, a management system of the cause of the failure of the one of the calls-of-interest and of recent configuration changes on the network device that are related to the cause of the failure of the one of the calls-of-interest.

2. The method of claim 1, wherein the list of multiple calls-of-interest comprises at least one of a calling number and a called number.

3. The method of claim 1, wherein the network device comprises a call controller.

4. The method of claim 1, wherein the network device comprises a session border controller.

5. The method of claim 1, wherein the network device is deployed within an enterprise network.

6. The method of claim 1, wherein the notifying comprises sending at least one of a calling number, a called number, or a device ID to the management system.

7. The method of claim 1, further comprising:
   determining, at the network device, that the failure of the one of calls-of-interest occurred at another network device along a network path; and
   sending, from the network device to the another network device along the network path, a trigger command that is configured to cause the another network device to determine a cause of the failure of the one of the calls-of-interest.

8. The method of claim 7, wherein the network device comprises a call controller and the another network device comprises a session border controller.

9. The method of claim 7, further comprising the network device exchanging diagnostics data analysis capabilities with the another network device.

10. The method of claim 9, further comprising exchanging the diagnostics data analysis via session initiation protocol (SIP).

11. A device comprising:
    an interface configured to enable network communications to switch incoming and outgoing calls;
    a memory; and
    one or more processors coupled to the interface and the memory, and configured to:
      receive a list of multiple calls-of-interest to monitor;
      detect a failure of one of the calls-of-interest;
      trigger, in response to detecting the failure of one of the calls-of-interest, diagnostics data analysis of data associated with the failure of one of the calls-of-interest;
      determine, based on the diagnostics data analysis, a cause of the failure of the one of the calls-of-interest; and
      notify a management system of the cause of the failure of the one of the calls-of-interest and of recent configuration changes that are related to the cause of the failure of the one of the calls-of-interest.

12. The device of claim 11, wherein the list of multiple calls-of-interest comprises at least one of a calling number and a called number.

13. The device of claim 11, wherein the device is implemented as a call controller.

14. The device of claim 11, wherein the device is implemented as a session border controller.

15. The device of claim 11, wherein the one or more processors are further configured to notify by sending at least one of a calling number, a called number, or a device ID to the management system.

16. The device of claim 11, wherein the one or more processors are further configured to:
    determine that the failure of the one of the calls-of-interest occurred at a network device along a network path; and
    send, to the network device along the network path, a trigger command that is configured to cause the network device along the network path to determine a cause of the failure of the one of the calls-of-interest.

17. One or more non-transitory computer readable storage media encoded with instructions that, when executed by a processor of a device that switches incoming and outgoing calls, cause the processor to:
    receive a list of multiple calls-of-interest;
    detect a failure of one of the calls-of-interest;
    trigger, in response to detecting the failure of one of the calls-of-interest, diagnostics data analysis of data associated with the failure of the one of the calls-of-interest;
    determine, based on the diagnostics data analysis, a cause of the failure of the one of the calls-of-interest; and
    notify a management system of the cause of the failure of the one of the calls-of-interest and of recent configuration changes that are related to the cause of the failure of the one of the calls-of-interest.

18. The one or more non-transitory computer readable storage media of claim 17, wherein the list of multiple calls-of-interest comprises at least one of a calling number and a called number.

19. The one or more non-transitory computer readable storage media of claim 17, wherein the processor is configured to operate as a call controller.

20. The one or more non-transitory computer readable storage media of claim 17, wherein the processor is configured to operate as a session border controller.

\* \* \* \* \*